(12) United States Patent
Riethmueller

(10) Patent No.: US 8,758,665 B2
(45) Date of Patent: Jun. 24, 2014

(54) COMBINATION PACKAGING CONTAINER AND METHOD OF PRODUCING IT

(75) Inventor: Steffen Riethmueller, Widnau (CH)

(73) Assignee: Rundpack AG, Diepoldsau (CH)

( * ) Notice: Subject to any disclaimer, the term of this patent is extended or adjusted under 35 U.S.C. 154(b) by 166 days.

(21) Appl. No.: 13/260,983

(22) PCT Filed: Mar. 31, 2010

(86) PCT No.: PCT/EP2010/002044
§ 371 (c)(1),
(2), (4) Date: Oct. 12, 2011

(87) PCT Pub. No.: WO2010/112208
PCT Pub. Date: Oct. 7, 2010

(65) Prior Publication Data
US 2012/0055832 A1 Mar. 8, 2012

(30) Foreign Application Priority Data

Apr. 1, 2009 (AT) .................................. A 520/2009

(51) Int. Cl.
*B29C 59/02* (2006.01)

(52) U.S. Cl.
USPC ........................................................ 264/320

(58) Field of Classification Search
USPC ........................................................ 264/320
See application file for complete search history.

(56) References Cited

U.S. PATENT DOCUMENTS

| | | |
|---|---|---|
| 4,325,905 A | 4/1982 | Takahashi |
| 4,550,854 A | 11/1985 | Schellenberg |
| 5,025,981 A | 6/1991 | Schellenberg |
| 7,481,356 B2 | 1/2009 | Stahlecker |
| 7,905,821 B2 | 3/2011 | Stahlecker |
| 2006/0118608 A1 | 6/2006 | Stahlecker |
| 2008/0098698 A1 | 5/2008 | Dart et al. |
| 2009/0159653 A1 | 6/2009 | Stahlecker |
| 2011/0174656 A1 | 7/2011 | D'Amato |

FOREIGN PATENT DOCUMENTS

| | | |
|---|---|---|
| CH | 693 611 | 11/2003 |
| DE | 81 24 014 | 12/1981 |
| DE | 31 20 075 | 3/1982 |
| DE | 33 26 369 | 2/1984 |
| DE | 295 01 247 | 2/1996 |
| DE | 195 09 100 | 5/1996 |
| DE | 100 10 225 | 2/2002 |

(Continued)

OTHER PUBLICATIONS

International Search Report of PCT/EP2010/002044, Jun. 16, 2010.

*Primary Examiner* — Larry Thrower
(74) *Attorney, Agent, or Firm* — Collard & Roe, P.C.

(57) ABSTRACT

The invention relates to a combination packaging container (2, 2') comprising a beaker-shaped inner container (3) with a container jacket (17), a base (18) and a flange (20) projecting out from the container jacket (17) in the region of its open end (19), as well as a sleeve-shaped outer part (4) surrounding the inner container (3) at its container jacket (17) with end regions (11, 12) spaced apart from one another in the direction of a longitudinal axis (9). The inner container (3) is laid against and molded onto an internal face (10) of the sleeve-shaped outer part (4). The sleeve-shaped outer part (4) is of a single-layered design between its end regions (11, 12) spaced apart from one another in the direction of the longitudinal axis (9). An end face (29) of the outer part (4) lying opposite the flange (20) constitutes a standing surface for the combination packaging container (2, 2').

21 Claims, 10 Drawing Sheets

(56) References Cited

FOREIGN PATENT DOCUMENTS

| | | |
|---|---|---|
| DE | 20 2004 015 374 | 3/2006 |
| DE | 20 2007 016 006 | 4/2008 |
| EP | 0 102 522 | 3/1984 |
| EP | 0 408 515 | 1/1991 |
| EP | 1 785 265 | 5/2007 |
| GB | 1 261 531 | 1/1972 |
| GB | 2 420 267 | 5/2006 |
| GB | 2 471 252 | 12/2010 |
| JP | 2005-007647 | 1/2005 |
| JP | 2008-194911 | 8/2008 |
| WO | WO 98/13270 | 4/1998 |
| WO | WO 2005/100167 | 10/2005 |
| WO | WO 2006/066036 | 6/2006 |
| WO | WO 2009/130043 | 10/2009 |

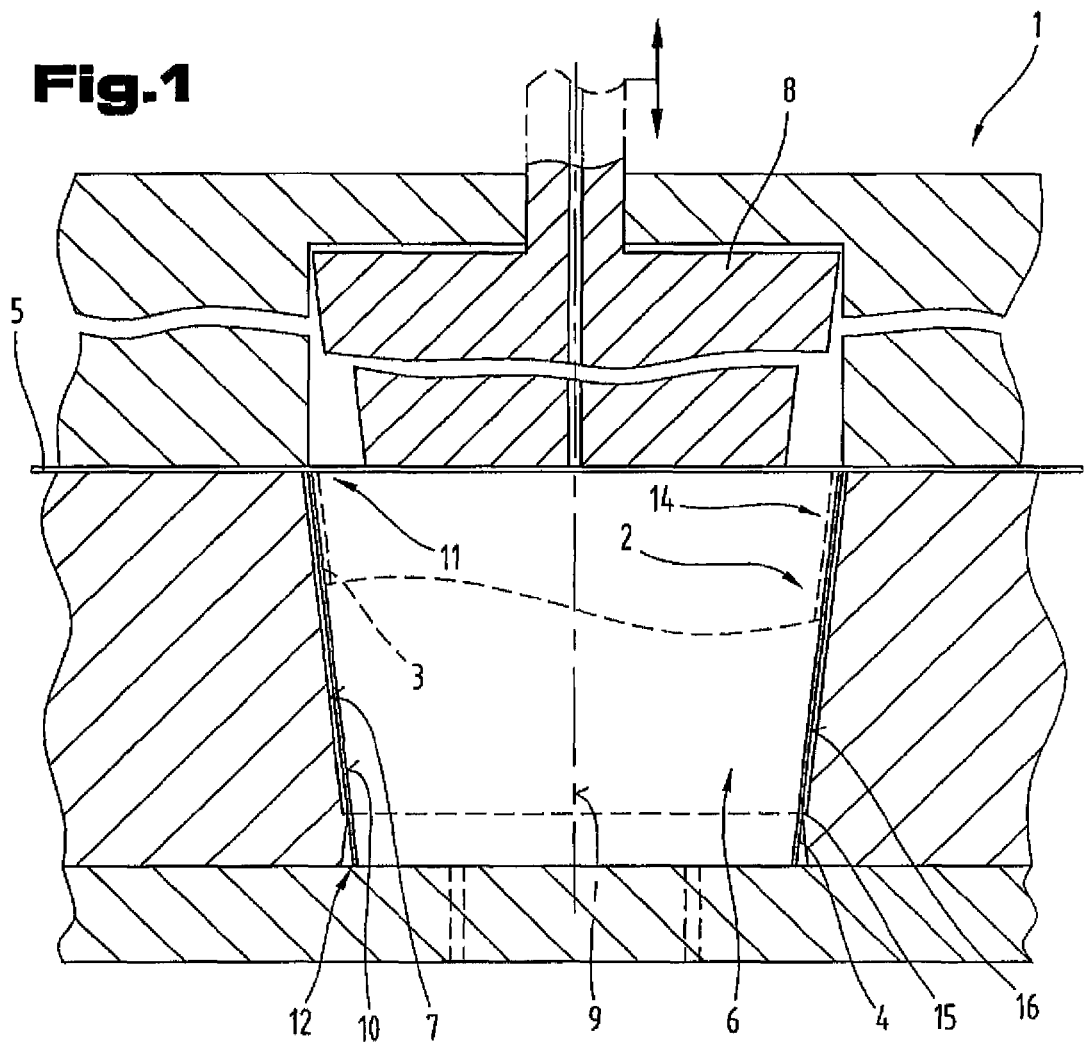
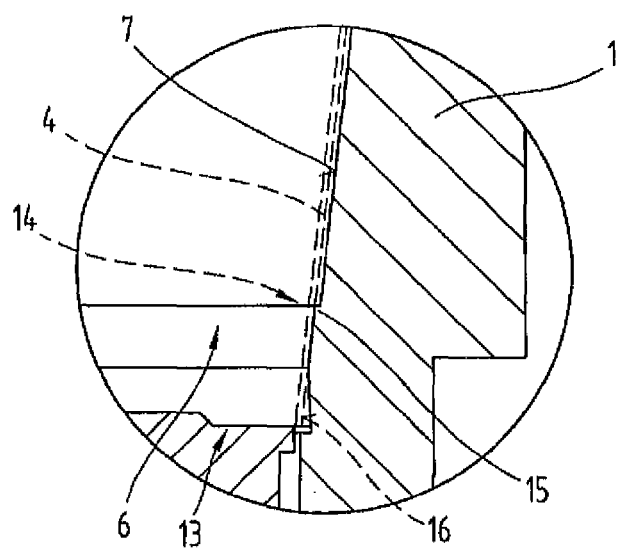

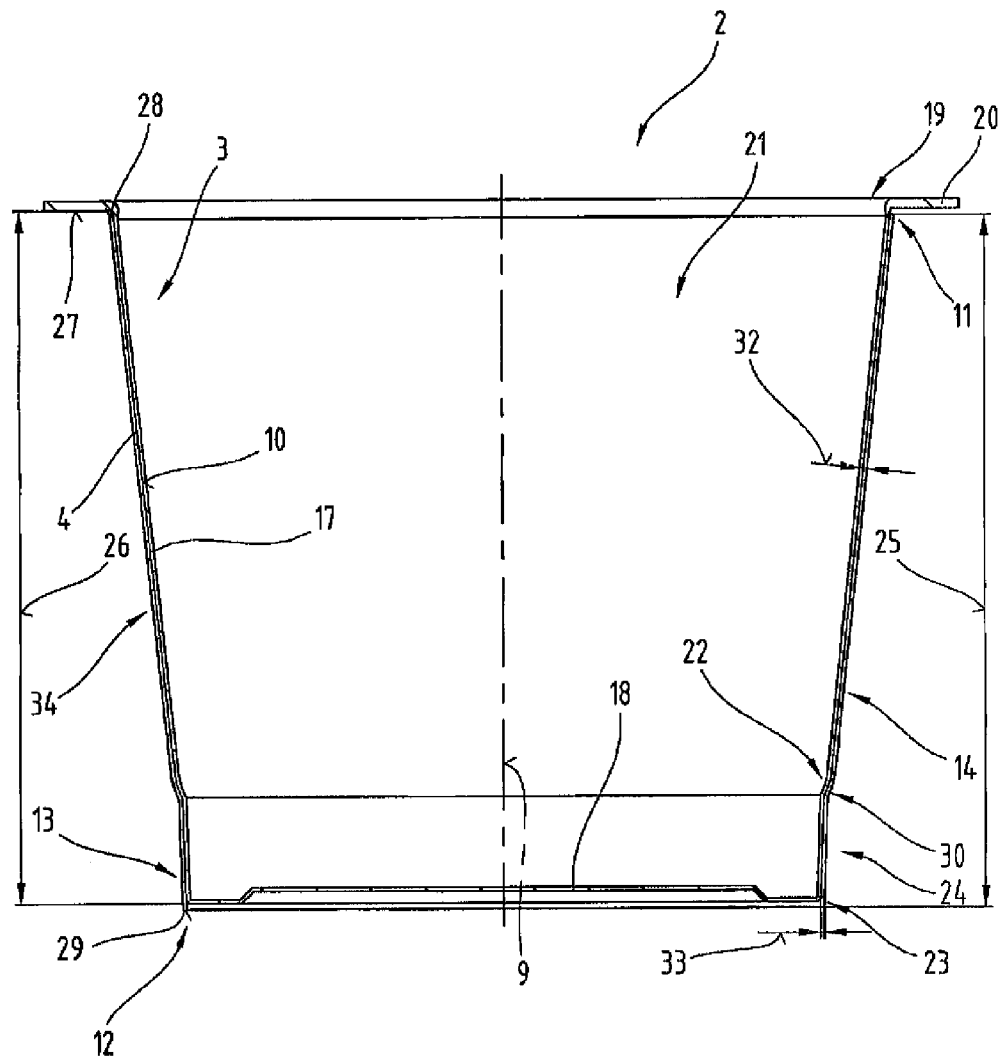

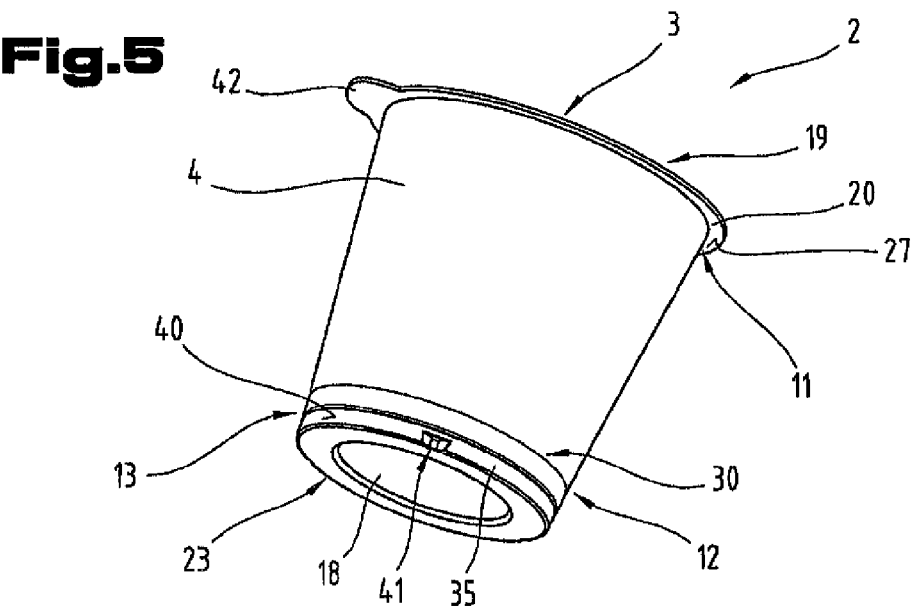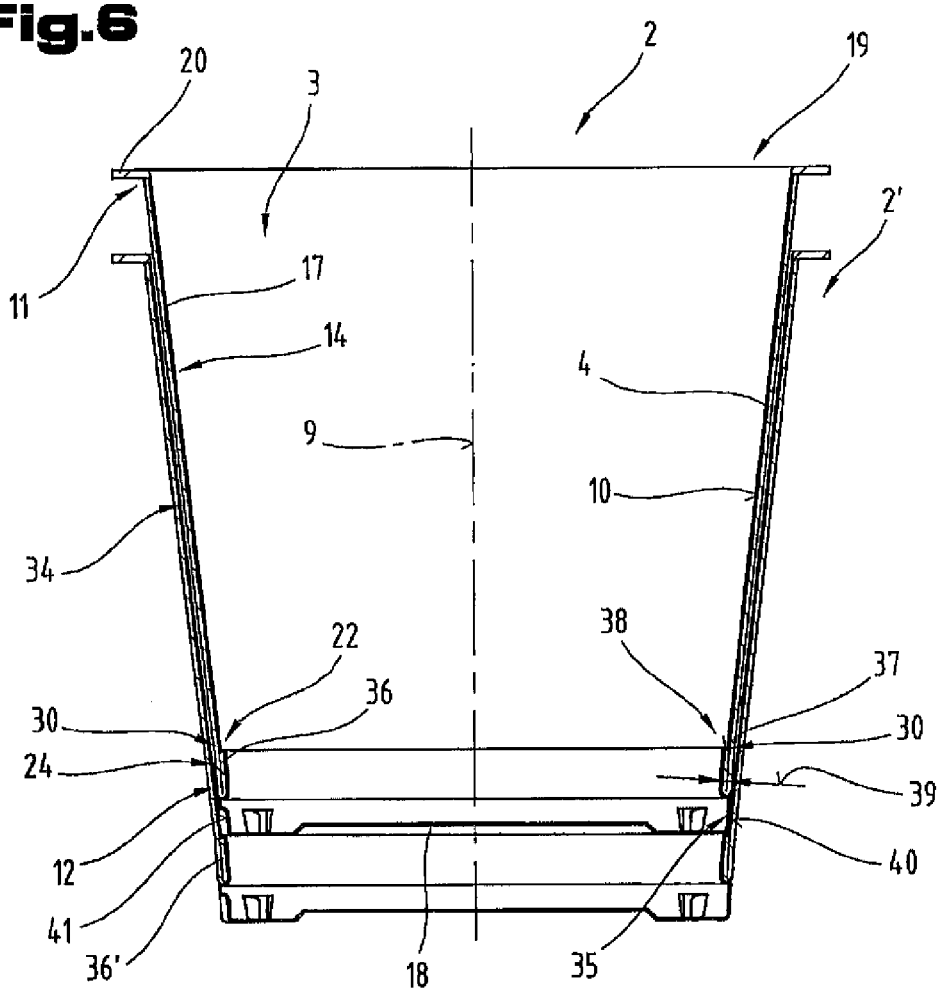

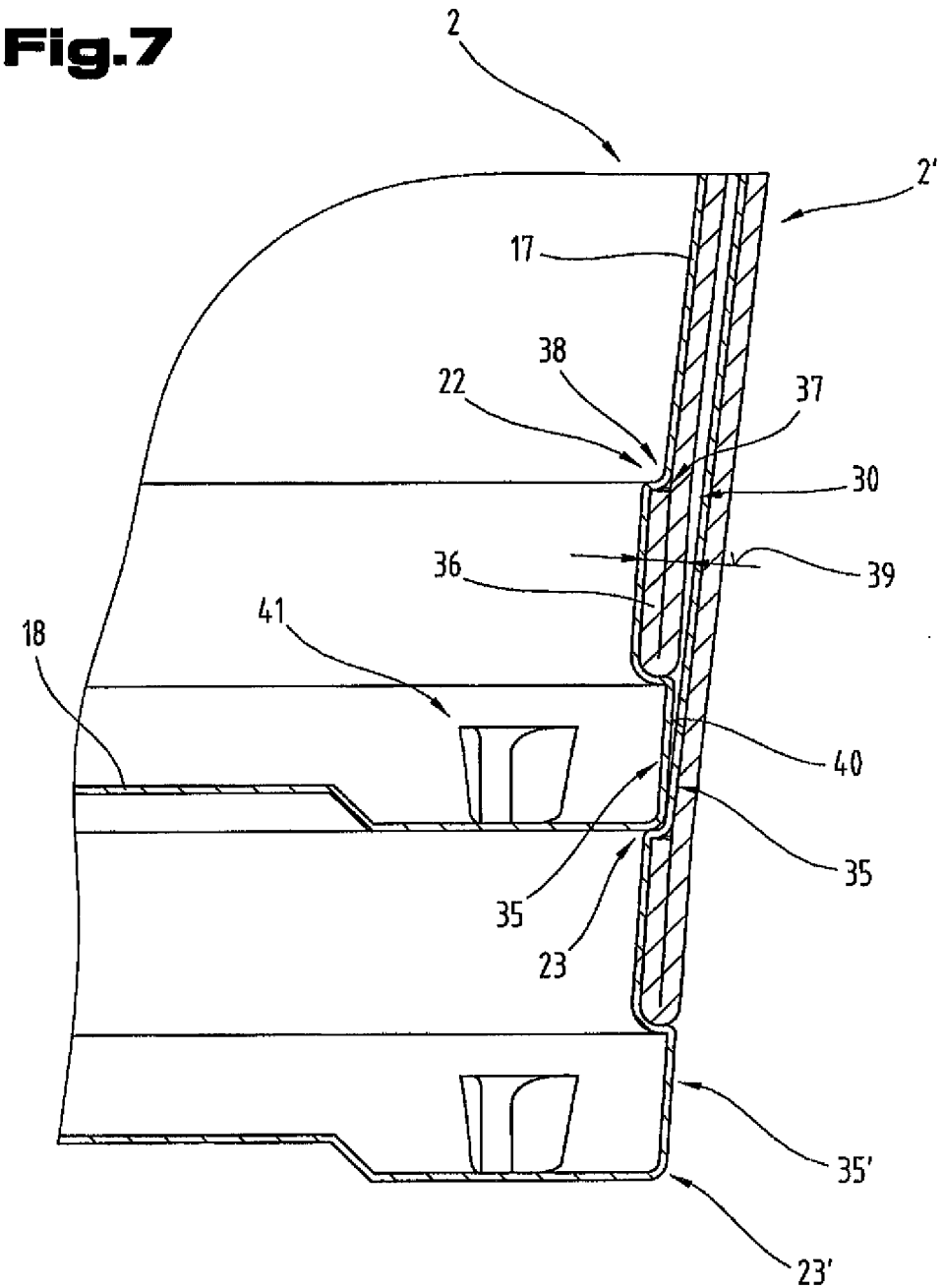

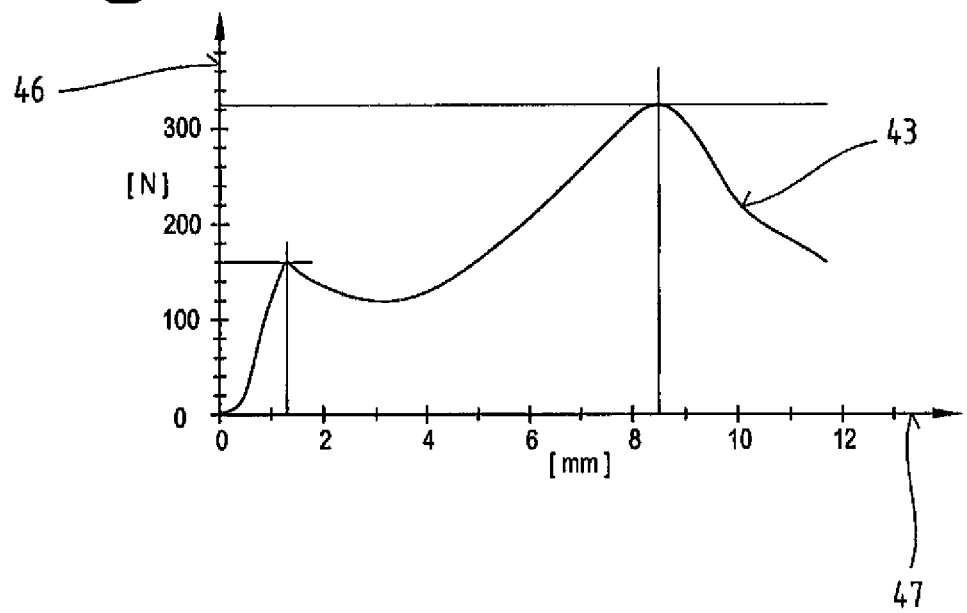
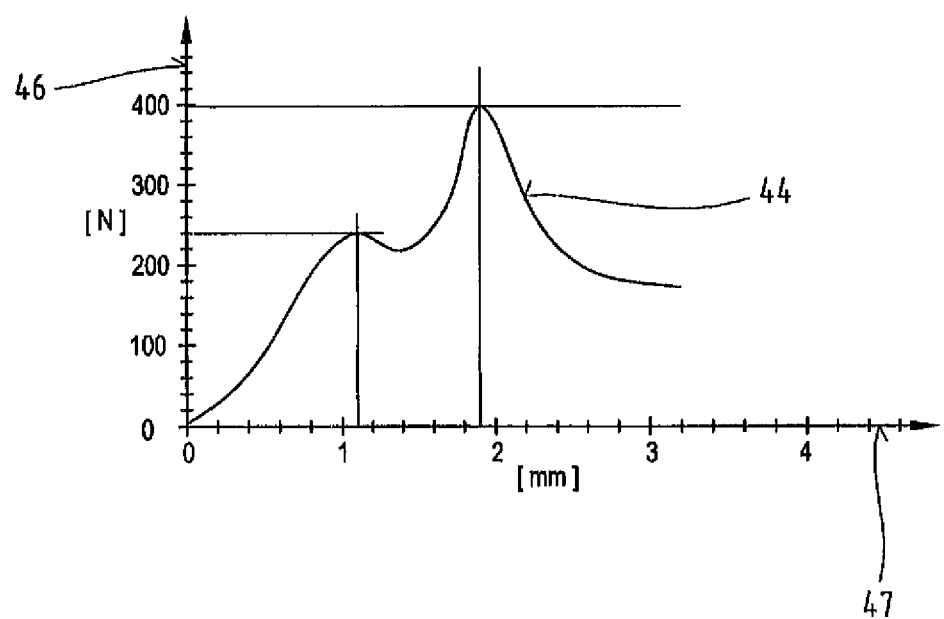

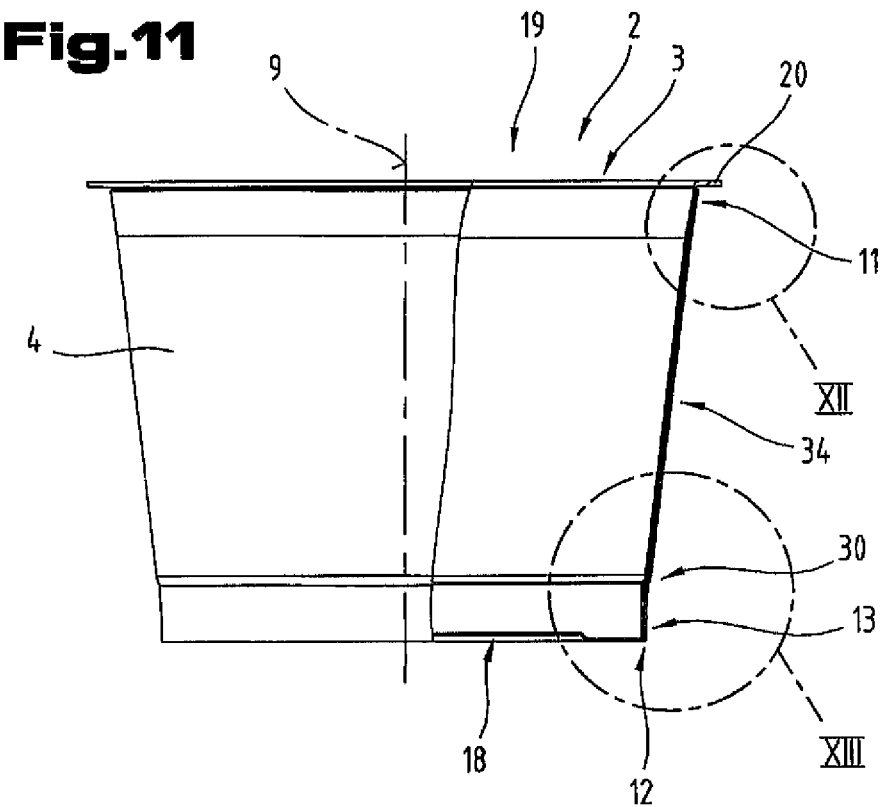
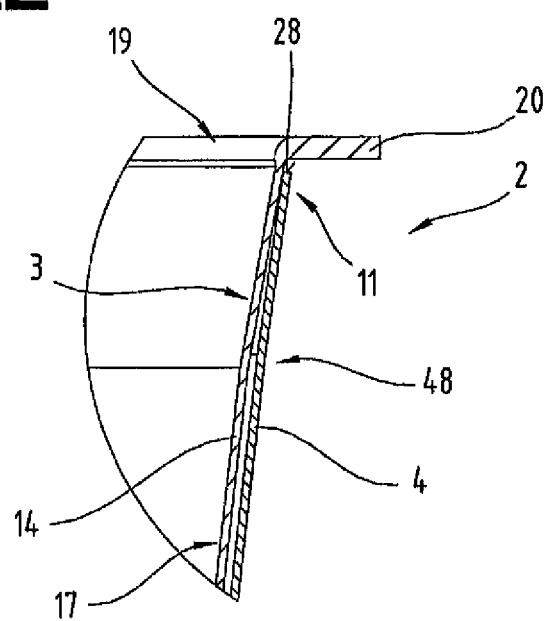

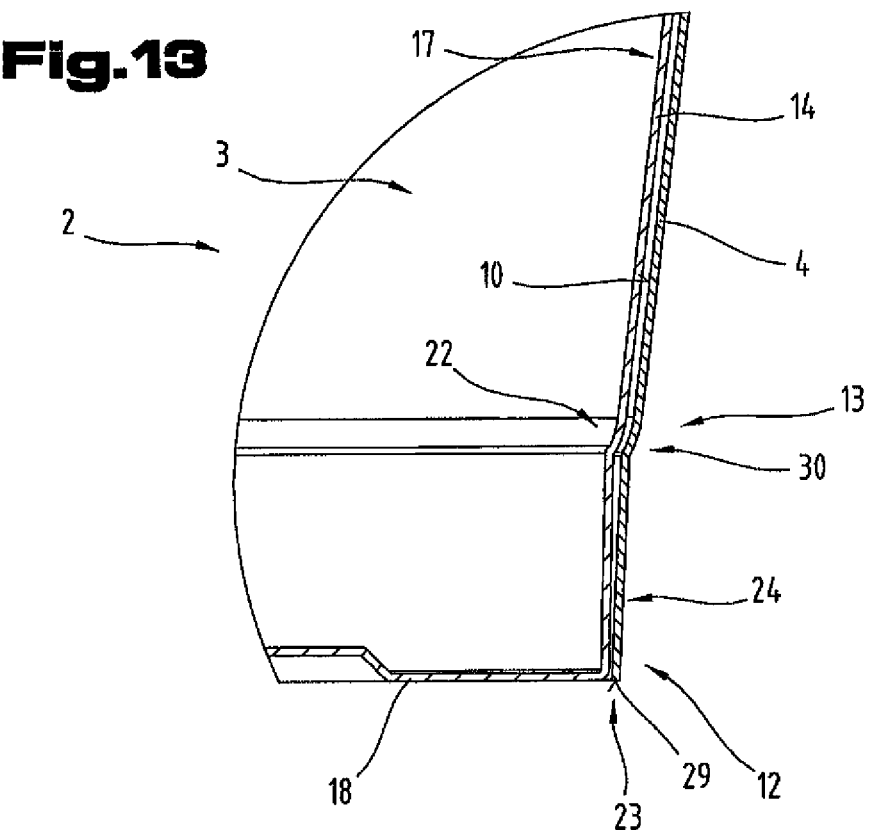
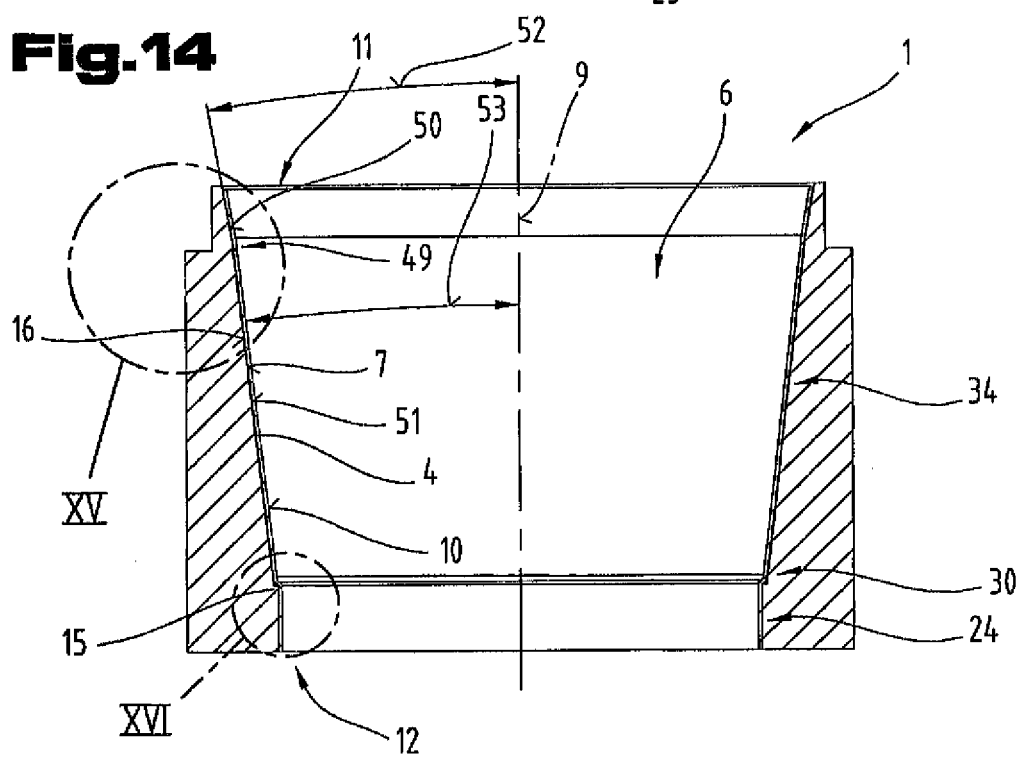

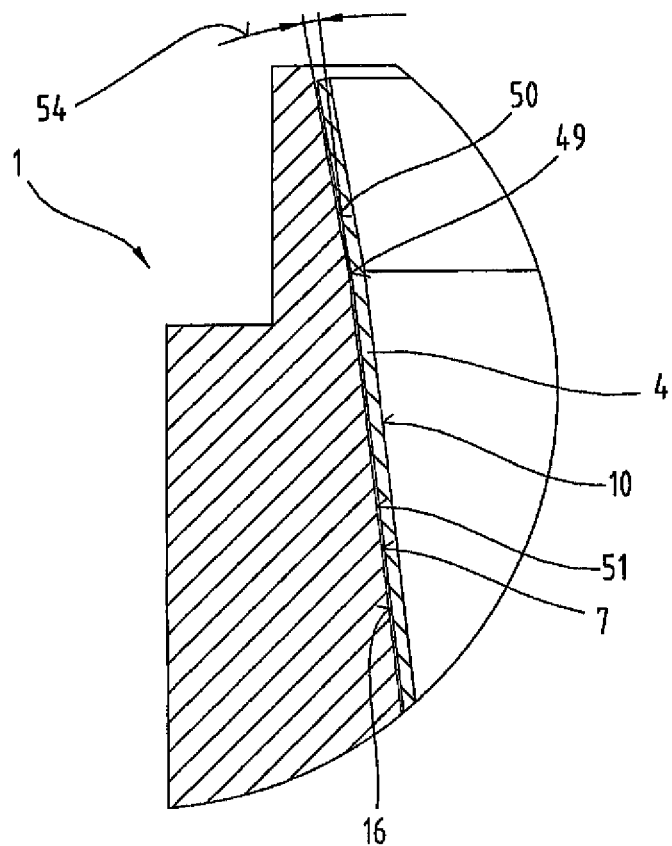
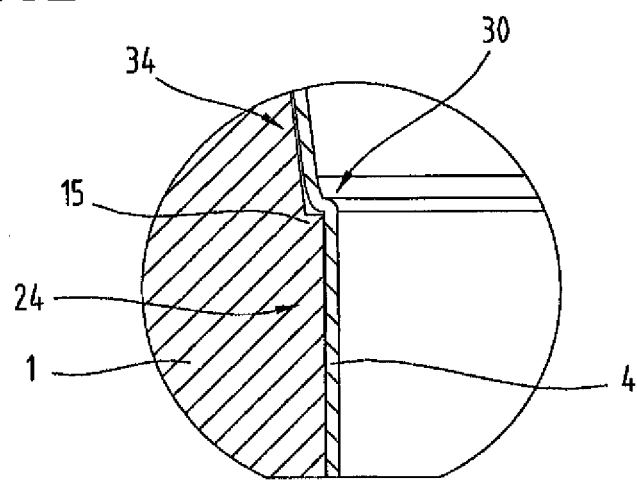

COMBINATION PACKAGING CONTAINER AND METHOD OF PRODUCING IT

CROSS REFERENCE TO RELATED APPLICATIONS

This application is the National Stage of PCT/EP2010/002044 filed on Mar. 31, 2010, which claims priority under 35 U.S.C. §119 of Austrian Application No. A 520/2009 filed on Apr. 1, 2009, the disclosure of which is incorporated by reference. The international application under PCT article 21(2) was not published in English.

The invention relates to a combination packaging container, a method of producing a combination packaging container and a deep-drawing mould for producing the combination packaging container using the method, as described herein.

A method of producing a conical plastic container with an outwardly extending opening rim by deep-drawing is known from patent specification DE 33 26 369 C2 or EP 0 102 522 A1. In this instance, the plastic container is made by deep-drawing a plastic film of uniform thickness, and the plastic container is joined to a layer of a different type of material in the deep-drawing mould although it is not welded to the plastic material. This layer of a different type of material is produced in the form of a sleeve, which is placed in the deep-drawing mould prior to the deep-drawing process so that its bottom and top edge is enclosed by the plastic film during deep-drawing. During deep-drawing, the film can be drawn to a minimal thickness that will guarantee the tightness of the container to be produced in the region intended for placing in contact with the seal. To enable several containers of the same type to be stacked, an outwardly projecting stacking shoulder is provided in the region of its open end, which supports the other container by means of an outwardly projecting opening rim in the region of the open end. The wall portion between the stacking shoulder and opening rim is of a complementary conical shape with respect to the wall portion extending to the base to enable a stack to be formed. Separate work operations are needed to achieve this, by punching stacking shoulders into the sleeve prior to deep-drawing on the one hand and beading over the bottom end directed towards the base on the other hand. The disadvantage of this is that the stability of the carton is reduced by the outwardly projecting stacking shoulder and the intrinsic deformation of the sleeve due to compression stress is reduced.

Document DE 31 20 075 A1 discloses another method and a container produced by this method. In this instance, a paper container comprising a container wall and container base is placed in the deep-drawing mould prior to deep drawing and its shape at least approximately corresponds to the external shape of the combination packaging container to be produced. During the deep-drawing process, the part of the container made from plastic which has to be moulded is deformed in this prefabricated paper container and is moulded against the internal surface of the paper container and thus joined to it. In order to prevent combinations packaging containers of the same type from sticking to one another when stacked, a stacking shoulder is provided on the container wall in the region of the open end. It is step-shaped and projects outwards around the circumference. When several combination packaging containers of the same type are stacked one inside the other, the outwardly projecting stacking shoulder is supported on the combination packaging container in which it is stacked by means of its top opening rim. The disadvantage of this is the design of the stacking aids and the fact that the entire outer container, in particular the container base, is made from a paper or cardboard material. If the cardboard material comes into contact with moisture, the carton can be damaged or destroyed.

Patent specification CH 693 611 A5 discloses another conical combination packaging container, which has a jacket part made from a cardboard material extending as far as its base rim. In order to form an annular, circumferentially extending container foot, the base rim has a fold. An inner container made from plastic is moulded into the jacket part made from cardboard material during the deep-drawing process, and the inner container overlaps a part of the fold of the jacket part so that a profiled region in this portion forms a positive connection between the two container parts. In the region of its top open end, a stacking shoulder is likewise provided on the jacket part so that several containers of the same shape can be loosely stacked in one another. The container wall is again of a conical shape complementing the other wall portion, so that the stacking shoulder is supported on the top rim of the other carton extending out in a flange-type arrangement. The design of the stacking shoulder and the complementary conical wall portion again reduce the stability of the combination packaging container as a whole.

Patent specification WO 98/13270 A1 discloses a different method of producing a beaker-shaped combination packaging container comprising a plastic inner part and an outer part, as well as a combination packaging container produced by the method. In this instance, the beaker-shaped inner part made from plastic and the jacket-type outer part externally surrounding the plastic material are manufactured separately from one another. In order to form the combination packaging container, the jacket-type outer part is pushed over the ready-moulded, beaker-shaped plastic inner part and then secured to the beaker-shaped plastic inner part. Latching means are provided on the plastic inner part for this purpose, in which the jacket-type outer part latches in order to secure it on the beaker-shaped plastic inner part so that it can be released. Accordingly, a first catch means in the base region of the beaker-shaped plastic inner part is formed by a circumferentially extending shoulder, the external diameter of which is bigger than the internal diameter of the bottom edge of the jacket-type outer part. As it is pushed on, the jacket-type outer part is pushed by means of its bottom edge far enough past the circumferentially extending shoulder that it latches behind the shoulder. Another catch means is provided by the top, outwardly projecting rim of the beaker-shaped plastic inner part. Accordingly, the jacket-type outer part is pushed so far in the direction of the circumferentially extending rim as it is pushed on by its tope edge that it moves into contact with it and is retained due to the latching action between the rim and the circumferentially extending shoulder. Due to the fact that the two components are made separately prior to the nesting operation, it is easily possible to provide stacking aids or stacking means in the region of the base of the carton, thereby enabling several combination packaging containers of the same type to be stacked one inside the other without any mutual jamming.

Patent specification DE 195 09 100 A1 describes a two-part packaging container comprising a plastic beaker and a cardboard sleeve surrounding it, these parts being assembled after having been manufactured separately. The cardboard sleeve is formed from a cardboard blank with an overlap seam and tapers towards the bottom. The cardboard sleeve also lies tightly against the plastic beaker so that the cardboard sleeve imparts extra strength to the beaker walls of the plastic beaker. A bottom edge of the cardboard sleeve is terminated by the base of the plastic beaker or projects out at a distance from an external face of the base and beyond it in the direction of the longitudinal axis of the packaging container. The bottom edge of the cardboard sleeve is reinforced by an inwardly bent fold. In order to accommodate the inwardly bent fold, the container jacket of the plastic beaker has a wall portion inwardly offset from the container jacket in an immediately adjacent transition region starting from the base, in order to form a receiving space. Also disposed at the foot end—in other words in the region of the base of the plastic beaker—are cams, which create a stacking distance between plastic beakers when stacked one inside the other. As a result, the plastic beakers can be stacked one on top of the other, separated by the cardboard sleeve, so that they can be removed without adhering or sticking together.

Document DE 20 2004 015 374 U1 describes a container for foodstuffs such as dairy products and similar, comprising a beaker and a jacket. The beaker in turn has a base surface and a casing portion. The jacket surrounds at least part of the casing portion of the beaker. At its open end region, the beaker has an offset step, which serves as a stop for the jacket. Disposed underneath this step on the external face in the region of its casing portion are several profiled regions, which serve as retaining cams for the jacket. The casing portion of the beaker tapers in a conical design from the open end towards the base, whereas the jacket is of a cylindrical shape and the jacket blank is therefore of an essentially rectangular shape in the flat state. In order to compensate between the cylindrically shaped jacket and the conically tapering casing portion, the jacket is beaded over in the region of the base and thus forms a bigger bead.

Document DE 295 01 247 U1 describes a combination packaging incorporating several materials, which are preferably selected from plastic and paper. The combination packaging comprises a stackable, insertable carton which is disposed in a wound cylinder, preferably of paper. This cylinder is provided with a bead in the region of the base and is supported on the jacket of the carton lying inside. At its open end region, the stackable carton has a specially shaped top edge, which is used to establish a seal with a seal disc. The combination packaging is also provided with a lid, which is preferably also made from plastic. The bead is supported on the smooth external wall of the inwardly offset jacket portion of the insertable carton.

Patent specification EP 0 408 515 A1 describes a packaging container designed to enable the plastic part and cardboard part of a used packaging container to be recycled separately on disposal. In this instance, the cardboard jacket reinforcing the circumferential wall and only positively joined to the plastic beaker has a tear-off strip so that it can be detached from the plastic beaker when torn open. The tear-off strip is disposed in the overlap region of the cardboard jacket. The latter has only one weakened line bounding it on one side and covered by the overlap. When being torn open, the inner overlap edge acts as a cutting edge for the outer overlap layer.

The underlying objective of this invention is to propose a strong combination packaging container requiring the minimum of material with stacking aids in its base region, a method of manufacturing the combination packaging container whereby manufacturing is as cost effective as possible requiring few work steps and little complexity in terms of moulding, as well as a deep-drawing mould designed for this purpose.

One objective of this invention is achieved due to the fact that the sleeve-shaped outer part is provided as a single layer between its end regions spaced apart from one another in the direction of the longitudinal axis and an end face of the outer part lying opposite the flange serves as a standing surface for the combination packaging container.

The advantages achieved as a result of the combination of features defined in claim 1 reside in the fact that it is possible to make do with a strong outer jacket in the form of the outer part extending continuously across the entire height of the combination packaging container and this is of a continuously single-layered design with the exception of the overlap seam which may optionally be provided. Due to the fact that the end face of the outer part in the base region also simultaneously serves as a standing surface for the whole combination packaging container, the inner container, which is usually made from a plastic material, serves no other purpose than to impart a sealing function for containing the food or drink contained in it. The overall strength is achieved by means of the sleeve-shaped outer part. The load which has to be supported can therefore be transmitted from the flange and the end face of the outer part disposed immediately adjacent to it directly down to the standing surface.

Independently of the above, however, the objective of the invention can also be achieved due to the fact that a supporting region projecting in the direction towards the longitudinal axis is provided in a terminal end in the fold of the container jacket facing away from the base, which constitutes a first supporting means and the outer part between its two end regions has a pinched region extending in the direction towards the longitudinal axis, and it is disposed in the region of the terminal end of the fold and forms a first and another wall portion between the pinched region and the two end regions respectively.

The advantages obtained as a result of the combination of features in an embodiment described herein reside in the fact that the outer part is additionally strengthened by a fold in the end region facing the base. The end face of the fold directed towards the open end of the combination packaging container is used for the stacking function. In addition, a pinched region in the region of the terminal end of the fold is also obtained by means of an additional offset in the direction towards the longitudinal axis which extends between the end regions in the direction towards the longitudinal axis. As a result of this pinched region and the supporting region additionally obtained at the terminal end of the fold at the same time, optimum stacking is obtained for the other combination packaging container to be stacked in it but with a low stack height. With the exception of the kink formed by the pinched region, this results in a continuously straight wall portion which means that optimum use is made of the bearing capacity of the outer part.

Another embodiment described herein is possible, whereby the stacking means which co-operates with the end face constituting the standing surface is also provided on the side facing the interior of the combination packaging container. As a result of this pinched region, the cross-section narrows in a plane directed perpendicular to the longitudinal axis but only to the degree that the end face of the outer part is optimally supported on it whilst nevertheless preserving the stability.

As a result of another embodiment described herein, optimum moulding of the two components is achieved by the inline process.

In another advantageous embodiment is described herein because a defined support surface is obtained which constitutes the supporting means.

Also possible is another embodiment described herein, whereby it is possible to make do with slim wall thicknesses for both components on the one hand, but several combination packaging containers can be stacked in one another perfectly without sticking to each other.

Another advantageous embodiment is defined described herein, wherein in spite of an open cut edge of the outer part at the end face constituting the standing surface, absorption of moisture can be significantly reduced or totally prevented due to the seal. Not only does this make production of the blank simple, it also makes it easier to place the outer part upright afterwards. This results in a saving on additional moulds, such as those needed to produce the fold, in the part of the plant used to produce the combination packaging container.

Also of advantage is another embodiment described herein, wherein the supporting region is made extra large and the radial offset in the region of the container wall can therefore be made larger.

Also of advantage is an embodiment described herein, wherein absorption of moisture, in particular water, in what is usually a supporting sleeve made from a cardboard or paper material, can be prevented for a longer period of time.

Another possible embodiment is described herein, whereby a non-deformed advertising surface can be provided. In addition, however, all kinks which might reduce stability are avoided.

Also of advantage is an embodiment described herein, which makes it possible to stack a plurality of combination packaging containers one inside the other.

Yet another advantageous embodiment is described herein, which again makes it possible to provide a non-distorted advertising surface which also has adequate intrinsic stiffness.

An embodiment described herein is also of advantage because the external dimension for forming the stacking or supporting means in the lowermost base region can be easily set.

Another advantageous embodiment is described herein, whereby the stacking forces can be introduced into the jacket-type outer part in a more or less straight line.

Another embodiment described herein is of advantage because the stack height of combination packaging containers stacked one inside the other can be kept very short.

As a result of another advantageous embodiment described herein, an exactly defined support is obtained between combination packaging containers stacked one inside the other.

Also of advantage is yet another embodiment described herein, because the bottom end region of the jacket-shaped outer part can be disposed at a distance apart from the support surface of the combination packaging container, thereby avoiding any direct contact with moisture, in particular water.

Another embodiment described herein is also of advantage because the bottom end region of the jacket-shaped outer part is held from underneath and any unintentional slipping off the inner container is prevented.

Another embodiment described herein is of advantage because an orifice for air can be provided in the base region to prevent a vacuum from forming between combination packaging containers stacked one inside the other when removing them. This enables these containers to be removed from the stack without any problem.

Also of advantage is an embodiment described herein, wherein a reliable connection can be obtained between the inner container and the outer part.

Also of advantage is another embodiment described herein because the materials used are subjected to more extensive shrinking and thus enable the outer part to be supported on the container jacket of the inner container. This mutual supporting arrangement avoids any clearance between the outer part and inner container in the portion facing the open end of the combination packaging container, thereby enabling a better seating of the outer part on the inner container to be obtained.

An embodiment described herein is also of advantage because more effective allowance can be made for the shrinkage behaviour of the inner container and the rebounding of the outer part.

In the case of another advantageous embodiment described herein, a design based on a virtually straight line is achieved in the outer part as viewed in axial section. This also makes it possible to provide an abutment for the outer part at its top end region on the external wall of the inner container. This also enables a higher proportion of the load to be transmitted in the axial direction by the outer part.

The objective of the invention is also achieved independently of the above by means of a method as described herein. The advantages obtained as a result of the combination of features specified in this claim reside in the fact that an upright sleeve-shaped outer part can be obtained from a flat blank and can be placed in the deep-drawing mould in this unformed position or shape. The stacking means is produced simultaneously with the deep-drawing operation and shaping of the inner container. This obviates the need for additional forming operations and punching operations in separate stations. Not only does this save on the cost of moulds, it also dispenses with work steps, thereby resulting in even more cost-effective and efficient production of the combination packaging container. The pinched region is also punched into the jacket of the outer part in the same work operation as that during which the inner container is formed on the internal face. The work process during which the inner container is formed is therefore also used to impart the indented shape of the pinched region in the outer part at the same time.

Other advantageous approaches to producing the combination packaging container are described herein. The advantages obtained as a result may be found in the description.

An approach described herein is also of advantage because specifically using materials which can be subjected to a higher degree of shrinkage means that the outer part can be supported on the container jacket of the inner container. As a result of this mutual support, a clearance between the outer part and the inner container can be avoided in the portion facing the open end of the combination packaging container, thereby enabling a better seating to be obtained for the outer part on the inner container 3.

A feature described herein is also of advantage because greater allowance can be made for the shrinkage behaviour between the inner container and the rebounding of the outer part.

In one advantageous approach described herein, a design based on a virtually straight line in the outer part can be achieved as viewed in axial section. This also enables an abutment of the outer part on the external wall of the inner container 3 to be achieved in its top end region. This also enables a greater degree of load to be transmitted in the axial direction by the outer part.

The objective of the invention is also achieved by a deep-drawing mould for producing the combination packaging container using a method based on the characterising features described herein. The advantages obtained as a result of the combination of features defined in this claim reside in the fact that, because a predefined shoulder is provided, a spatial shape of the mould cavity is obtained, by means of which both the inner container can be formed and the pinched region imparted to form the supporting means in a single work operation.

Also of advantage is an embodiment described herein because a clearly predefined support surface can be obtained for producing the supporting means.

An embodiment described herein also offers advantages because it is possible to get by with only the slightest deformation of the jacket-shaped outer part as it is being moulded but co-operating supporting means can nevertheless be formed in the base region.

An embodiment described herein is also of advantage because it enables allowance to be made for using materials with a more pronounced shrinkage behaviour to produce combination packaging containers by an inline method. Due to the predefined deformation of the outer part and inner container, the container jacket of the inner container is able to shrink in the radial direction in the region of the buckled regions whilst nevertheless preserving an abutment of the outer part on the container jacket in the region of the top end region. The mutual abutment and support between these parts are obtained in conjunction with the automatic rebounding of the preformed outer part.

Finally, an embodiment described herein is of advantage because during joint shaping, a deviation from a straight line can be imparted to both the outer part and the inner container as viewed in axial section. This offers the possibility of making more effective allowance for the shrinkage behaviour of the inner container and automatic rebounding of the pinched region formed in the outer part.

To provide a clearer understanding, the invention will be described in more detail below with reference to the appended drawings.

These are highly schematic, simplified diagrams illustrating the following:

FIG. 1 is a view in section showing a part-region of a deep-drawing mould for producing the combination packaging container;

FIG. 2 shows a part-portion of the deep-drawing mould illustrated in FIG. 1 on a larger scale;

FIG. 3 is a view in section illustrating a first embodiment of a combination packaging container;

FIG. 5 is a diagram illustrating an example of another possible design of a combination packaging container;

FIG. 6 is a view in section showing the combination packaging container illustrated in FIG. 5;

FIG. 7 is a view in section on a larger scale showing a part-region of the combination packaging container illustrated in FIGS. 5 and 6 in its base region;

FIG. 8 is a diagram of the crushing test conducted on a combination packaging container made by the inline method as specified in EP 0 102 522 A1;

FIG. 9 is a comparative diagram of the crushing test conducted on a combination packaging container based on that illustrated in FIGS. 3 and 4;

FIG. 11 is a view in partial section showing another possible embodiment of a combination packaging container;

FIG. 12 is a view in section on a larger scale showing a part-region of the combination packaging container illustrated in FIG. 11 in the region of its open end, detail XII in FIG. 11;

FIG. 13 is a view in section on a larger scale showing a part-region of the combination packaging container illustrated in FIG. 11 in the base region, detail XIII in FIG. 11;

FIG. 14 is a simplified diagram showing a view in section of part of the deep-drawing mould used to produce the combination packaging container illustrated in FIGS. 11 to 13;

FIG. 15 is a view showing a partial section of the deep-drawing mould illustrated in FIG. 14, detail XV in FIG. 14, on a larger scale;

FIG. 16 is a view in section illustrating another part-portion of the deep-drawing mould illustrated in FIG. 14, detail XVI in FIG. 14, on a larger scale.

Figure 4:
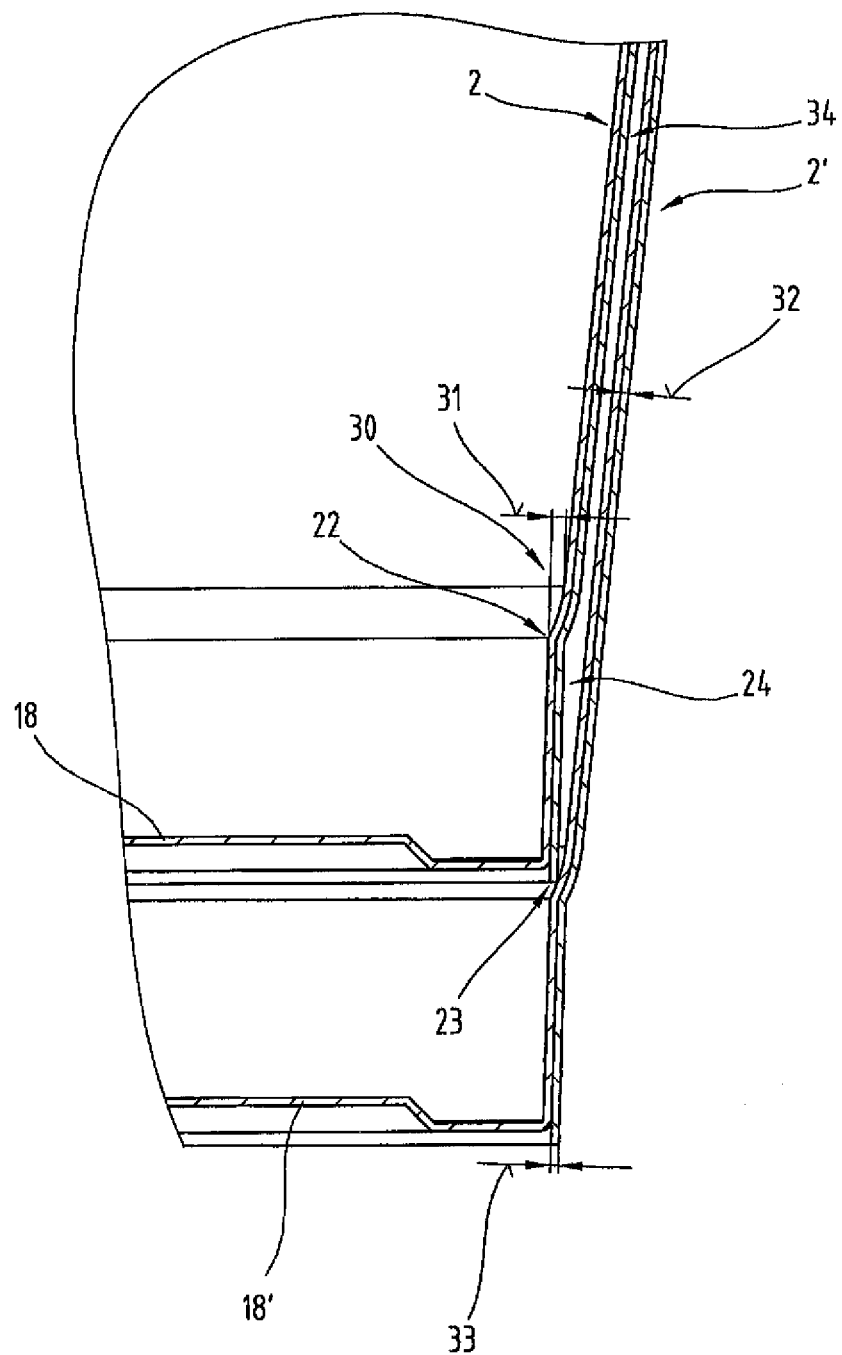
FIG. 4 is a view in section on a larger scale showing a part-region of the combination packaging container illustrated in FIG. 1 in its base region.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIGS. 1 and 2 are schematic, highly simplified illustrations of a deep-drawing mould 1, which is used to produce a combination packaging container 2 respectively 2', the latter comprising a beaker-shaped inner container 3 and at least one sleeve-shaped outer part 4 made by a deep-drawing process. Reference 2' will be used later with reference to combination packaging containers of the same design stacked one inside the other.

The sleeve-shaped outer part 4 is preferably made from a cardboard material with sufficient strength to absorb and transmit compression forces and is wound from a flat blank to form a jacket. The join is made at the mutually facing ends in the form of an overlap seam. Accordingly, all that is needed to make the jacket-shaped outer part 4 is a simple blank, which is formed by means of the overlap seam and a separation strip which may be optionally provided there as described in patent specifications EP 0 408 515 B1 and U.S. Pat. No. 5,025,981 A. Although not illustrated as such, this separation strip is used to tear off the jacket-shaped outer part 4, which may be made from a paper or cardboard material or alternatively from a plastic material.

The beaker-shaped inner container 3 is made from a sheet 5 by deep drawing, as indicated by broken lines in the region of a mould cavity 6 of the deep-drawing mould 1. The mould cavity 6 is bounded by at least one mould wall 7. With this method of producing the combination packaging container 2, the sleeve-shaped outer part 4 is placed in the deep-drawing mould 1 prior to deep drawing the beaker-shaped inner container 3 and moulded by a so-called "inline-method" which moulds the sheet 5 forming the inner container 3 with a moulding stamp 8 in the direction of a longitudinal axis 9, and a pressurising means additionally introduced into the mould cavity 6, for example compressed air, forces it against an internal face 10, preferably so that it lies flat and tightly against it. The internal face 10 simultaneously constitutes an internal surface of the outer part 4. Consequently, if the outer part 4 is viewed in axial section, it is inserted in the deep-drawing mould 1, in particular its mould cavity 6a, as a component extending continuously in a straight line between its end regions 11, 12 spaced apart from one another in the direction of the longitudinal axis 9. Accordingly, apart from the joining process, no other additional work steps are needed from the stage of the blank through to the closed jacket, such as beading or shaping to make stacking means or such like.

As may be seen more clearly from the detail illustrated in FIG. 2, the mould cavity 6 has what is preferably a step-shaped shoulder 15 in a base region 13 of the combination packaging container 2, which has to be moulded into the region of what will be a circumferentially extending container wall 14, which protrudes into the mould cavity 6 and in the direction towards the longitudinal axis 9. This might also be described as a neck. The shoulder 15 is bounded in the radial direction outside and inside, by reference to the longitudinal axis 9, by a shoulder end. If the combination packaging container 2 is of a rounded design, the shoulder surface constituting the shoulder 15 has an annular shape. The first mould wall 7 extends from the shoulder end or boundary terminating the shoulder 15 on the outside, in other words the portion which is disposed the farthest distance away from the longitudinal axis 9, as viewed in axial section, and becomes conically wider, by reference to the longitudinal axis 9, towards the end remote from the base region 13. Extending from the shoulder end or end portion of the shoulder 15 lying closer to the longitudinal axis 9 is the other mould wall 7' which, depending on the combination packaging container 2 being produced, is oriented at a different inclination from the first mould wall 7 as viewed in axial section. Consequently, the mould walls 7, 7' extend from the two shoulder ends in mutually remote or opposite directions. The mould wall 7' may be parallel with the longitudinal axis 9 or alternatively be oriented conically in the opposite direction from the first mould wall 7.

The outer part 4 is usually supported by its external face 16 on this shoulder 15, which preferably extends circumferentially around the longitudinal axis 9, in the unformed initial position.

The deep-drawing operation takes place in a known manner with the outer part 4 in this pre-positioned and as yet unformed position. To this end, the sheet 5 from which the inner container 3 is to be made is pre-stretched or pre-formed in the direction of the longitudinal axis 9 towards the base region 13 by means of the mould stamp 8 and then ultimately moulded to produce the finished combination packaging container 2 by introducing air compressed to a pressure above the ambient pressure with a lower limit of 4 bar, in particular 6 bar, and an upper limit of 15 bar, in particular 8 to 10 bar, for example. As a result of this process, the shoulder 15 is punched into the region of the outer part 4 which still runs in a straight line at the beginning to form the container wall 14.

As may be seen more clearly from FIGS. 3 and 4, the beaker-shaped inner container 3 comprises a container jacket 17, a base 18 and an open end 19 at the end remote from it. In the region of the open end 19, a flange 20 projecting out from the container jacket 8 may optionally be provided, which is used to provide a sealing closure with a closure device, although this is not illustrated, in particular a sealing foil or similar. For example, the flange 20 may also be described as a so-called seal flange or seal rim. The base 18 and the container jacket 17 therefore surround a container volume 21 designed to accommodate and thus supply different types of foodstuffs for consumption. These might be different types of drinks, dairy products, etc.

The inner container 3 may be made from a range of different plastic materials but also from other biologically degradable materials which lend themselves to deep drawing. In terms of plastics, films of polypropylene (PP) or polystyrene (PS) may be used, although polypropylene has the disadvantage of being more susceptible to shrinkage than polystyrene. The beaker-shaped inner container 3 illustrated here, in particular its container jacket 17, is of a conical design with respect to the longitudinal axis 9, tapering from the open end 19 towards the base 18.

In the case of known combination packaging containers made by the so-called "inline-method", it has been standard practice to provide stacking aids in the region of the open end 10, as already disclosed in DE 31 20 075 A1 and EP 0 102 522 A1 but also CH 693 611 A5. In the case of all these combination packaging containers, the sleeve-shaped outer part 4 had to be subjected to an appropriate punching or pre-moulding process, in addition to producing its blank, to enable appropriate stacking means to be made during the process of deep drawing the beaker-shaped inner container 3 at a later stage. This being the case, a stacking edge formed the edge between the seal flange and the container jacket and the other stacking edge was formed by a portion of the container jacket portion extending conically in the opposite direction in the external face of the combination packaging container in the region of its open end.

This pre-punching made it difficult to stack the blanks used to make the outer part 4 in a flat arrangement and another work step was necessary in addition to moulding it into the outer part 4. The fact that the jacket-shaped outer part 4 had to be placed in the deep-drawing mould 1 before deep drawing meant that moulding of the inner container 3 could only take place by appropriate moulding in the region of the jacket-shaped outer part 4 because the inner container 3 was moulded onto it lying tightly against its internal face 7 during the manufacturing process.

In the embodiment illustrated as an example here, co-operating supporting means 22, 23 are disposed or formed in the base region 13 to enable several combination packaging containers 2, 2' of the same type to be stacked one inside the other. By this is meant the transition or corner region between the base 18 and the container wall 14 and a wall portion 24 directly adjoining it.

The sleeve-shaped outer part 4 has a height 25 in the direction of the longitudinal axis 9 between its end regions 11, 12 which is the same as or longer than a distance 26 between a bottom face 27 of the flange 20 and the bottom face of the base 18. Accordingly, an end face 28 of what is in this instance the end region 11 disposed at the top can be supported on the bottom face 27 of the flange 20 and it lies against the bottom face 27. Yet another option would be for the end face 28 to be disposed immediately adjacent to the bottom face 27, in which case this will depend on the conical shape as well as the relative position of the outer part 4 in the mould cavity 6. The end face 29 is flat but preferably designed so that it extends beyond the base 18 in the direction remote from the open end 19.

In the case of the embodiment illustrated as an example here, the sleeve-shaped outer part 4 comprises a single layer with the exception of its joining zone in the overlap region between its end regions 11, 12 spaced apart from one another in the direction of the longitudinal axis 9. An end face 29 of the outer part 4 lying opposite the flange 20 also constitutes a standing surface for the combination packaging container 2, 2'. The single-layered design of the outer part 4 described above should be construed as meaning that there are no folds at all and optionally no additional inserted parts along the entire extension of the length or height of the outer part 4 in the direction of the longitudinal axis 9. A double layered approach in the joining region of the two mutually facing terminal ends where the blank has to be joined should not be ruled out, depending on the joining method chosen.

As a result of this design, load can be transmitted directly in the direction of the longitudinal axis 9 from the flange 20 via its bottom face 27 towards the circumferentially extending end face 28 of the outer part 4 and via it towards the end face 29 constituting the standing surface. This being the case, the inner container 3 merely fulfils the function of providing a sealed enclosure in the portion of its container jacket 17 for containing or supplying the foodstuffs or drinks for which it is intended. In the region of the container wall 14, the supporting function is assumed exclusively by the outer part 4. Since the base 18 does not extend beyond the end face 29 at its bottom face, it merely serves to bear the weight of the products contained in it.

As may be seen more clearly from FIG. 4, the supporting means 22, 23 described above are formed by the end face 29 of the outer part 4 facing the base 18 on the one hand and by a pinched region 30 in the container wall 14. This pinched region 30—as may also be seen from FIG. 2—is formed by the shoulder 15 moulded into the base region 13 during the process of moulding the entire container wall 14. Due to the pressurising medium introduced into the mould cavity 6, the outer part 4 is moulded around the step-shaped shoulder 15 first of all until it lies completely against both the outer part 4 and the inner container 3, in particular its container jacket 17 on the mould wall 7.

The pinched region 30 is therefore imparted to both the outer part 4 and the container jacket 17. The pinched region 30 preferably extends around the circumference of the combination packaging container 2, 2'. Irrespective of this, however, it would also be possible to provide or design the pinched region 30 so that it extends around only certain regions of the circumference and is distributed around predefined points. The requisite supporting function of the supporting means 23 formed by the end face 29 can still be achieved satisfactorily, even if the pinched region 30 does not extend continuously around the circumference. However, more effective support is obtained if the pinched region 30 does extend continuously around the circumference.

It is also of advantage if the pinched region 30 projecting in the direction towards the longitudinal axis 9 is of a step-shaped design or a step-shaped shoulder is provided in the region of the container wall 14. This shoulder then acts as a supporting region or support surface, which serves as the other supporting means 22. However, this pinched region 30 may also be described as a kink, by means of which the container wall 14 is offset in the direction towards the longitudinal axis 9. In this respect, joining transition radii may also be provided between the pinched region 30 and the adjoining wall portions 24 and 34. The pinched region 30 of the container jacket 17 therefore has a height 31 in the radial direction, by reference to the longitudinal axis 9, which is greater than an unformed initial thickness 32 of the outer part 4. This ensures that the supporting means 22 projects far enough in the direction towards the longitudinal axis 9 to enable the end face 29 of the outer part 4 to be supported without the packaging containers 2, 2' stacked one inside the other sticking.

As a result of the process described above which causes the pressing action against the container wall 14, in particular the wall portion 24 of the outer part 4, and against the mould wall 7 of the mould cavity 6, this wall portion 24 between the pinched region 30 and the end region 12 facing the base 18 is reduced in thickness 33 in the radial direction, by reference to the longitudinal axis 9, by an amount based on a lower limit of 2% and an upper limit of 20% of its unformed initial thickness 32. A more dense structure is obtained in this portion as a result of this compressing of the outer part 4, as a result of which moisture and water absorption is significantly reduced, even at the open cut edge in the region of the end face 29. In order to reduce this absorption capacity in the region of the open end face 29 even further, it may be of advantage if at least the end face 29 and optionally the wall portion 24 is additionally provided with a coating on its internal face 10 and/or its external face 16, although this is not illustrated. This coating is intended to prevent penetration by or absorption of moisture in the open cut edge and optionally the regions lying around it and may be selected from the group comprising varnishes, waxes, impregnating substances, etc.

As may also be seen from the diagram shown in FIG. 3, viewed in axial section, another wall portion 34 of the outer part 4 between the pinched region 30 and the end region 11 facing the flange 20, in particular the end face 28, is designed so that it extends in a straight line. This wall portion 34 of the outer part 4 may also be of a conical or frustoconical design, tapering from the flange 20 in the direction towards the base 18. The term conical relates to the axial section as well as to the longitudinal axis 9. The end region 12 or wall portion 24 of the outer part 4 disposed between the pinched region 30 and the base 18 may also extend continuously in a straight line as viewed in axial section. By preference, however, this wall portion 24 has a different, in particular less pronounced, inclination than the other wall portion 34 by reference to the longitudinal axis 9. The wall portion 24 of the outer part 4 between the end of the pinched region 30 and the end region 12 facing the base 18 may extend parallel with the longitudinal axis 9 for example. In the case of a combination packaging container 2 based on a rounded design, this wall portion 24 is cylindrical in shape. In order to obtain even better support or increase the dimension of the supporting means 23 formed by the end face 29, the wall portion 24 of the outer part 4 may be of a conical design, becoming wider from the end of the pinched region 30 in the direction towards the base 18 by reference to the longitudinal axis 9 as viewed in axial section. From a spatial point of view, therefore, the wall portion 24 forms a part of the frustoconical jacket.

In order to improve the connection still further, in particular to prevent the outer part 4 from being torn away from the inner container 3, it may be of advantage if the sleeve-shaped outer part 4 is joined to the container jacket 17 of the inner container 3 by means of a peel-off adhesive. By peel-off adhesive is meant an adhesive whereby there is nothing more than a bonded connection between the mutually facing surfaces but the outer part 4 can still be separated from the inner container 3 to enable them to be disposed of separately. This adhesive may be applied to the internal face 10 of the outer part 4 for example, before the erected outer part 4 is placed in the mould cavity 6 in readiness for subsequent moulding.

FIGS. 5 to 7 illustrate another embodiment of the combination packaging container 2, 2' which may optionally be construed as an independent solution, the same reference numbers and component names being used to denote parts that are the same as those described in connection with FIGS. 1 to 4 above. To avoid unnecessary repetition, reference may be made to the detailed description given with reference to FIGS. 1 to 4 above.

The combination packaging container 2, 2' illustrated here likewise comprises the beaker-shaped inner container 3 with its container jacket 17, the base 18 and the flange 20 disposed in the region of the open end 19. At least the major part of the container jacket 17 is surrounded by the outer part 4 and the container jacket 17 is also moulded directly onto the internal face 10 of the outer part 4 during the inline process.

In the embodiment illustrated as an example here, the base 18 and a part-portion 35 of the container jacket 17 extend beyond the bottom end region 12 of the outer part 4 in the base region 13. In addition, in what is here the bottom end region 12, the outer part 4 is reinforced by means of a preferably circumferentially extending fold 36, disposed on the internal face 10 of the outer part 4. By fold is meant the wall part of the outer part 4 which is folded back. By folding once, a single-layered format is obtained and by folding or beading over several times, a multi-layered fold 36 is obtained. A technically equivalent solution would be to use an additional annular-shaped component, which can be fitted on the internal face 10 of the outer part 4.

Otherwise, the sleeve-shaped outer part 4 is again of a single-layered design between its end regions 11, 12 spaced apart from one another in the direction of the longitudinal axis 9. One exception might be the overlap region mentioned above. A terminal end 37 of the fold 36 facing the open end 19 in conjunction with the pinched region 30 in the container jacket 17 serves as a supporting region projecting in the direction towards the longitudinal axis 9. The supporting region 38 in this instance constitutes the inwardly lying first supporting means 22.

In this example of an embodiment, the outer part 4 between the pinched region 30 and the two end regions 11, 12 spaced apart from one another in the direction of the longitudinal axis 9 each extend in a straight line. Consequently, if imagining a straight line connecting the two end regions 11, 12, the region of the pinched region 30 forms a kink in the container wall 14 extending in the direction towards the longitudinal axis 9. In order to extend the supporting region 38 still further in the radial direction towards the longitudinal axis 9, it is of advantage if the pinched region 30 is disposed in the region of the terminal end 37 of the fold 36. As a result, the container wall 14 between the pinched region 30 and the end region 12 facing the base 18 is divided into the first wall portion 24 and, between the pinched region 30 and the end region 11 facing the open end 19, the other part-portion 34.

In addition to or independently of the above, however, it would also be possible for the pinched region 30 to be of a step-shaped design, as described above. This being the case, the supporting region 38 will be made bigger in the radial direction, and its height in the radial direction by reference to the longitudinal axis 9 is greater than a thickness 39 of the fold 36. This additional shaping of the outer part 4 may also be obtained in the manner described above in connection with FIGS. 3 and 4. For the sake of simplicity, this will not be described in more detail.

The part-portion 35 of the container jacket 17 extending beyond the bottom end region 12 of the outer part 4 is preferably disposed with its external face 40 facing away from the longitudinal axis 9 at least more or less in the same planar arrangement as the external face 16 of the outer part 4 in the region of the first wall portion 24. Due to the fact that it projects in the radial direction, the container jacket 17 extends round the bottom end region 12 of the outer part 4 in the radial direction on the outside. This will prevent the outer part 4 from unintentionally coming apart from the inner container 3 due to the conical shape of the combination packaging container 2. This means that the adhesive between the outer part 4 and the inner part 3 could be dispensed with. The corner region between the base 18 and part-portion 35 therefore constitutes the other supporting means 23.

In order to make it easier to remove stacked combination packaging containers 2, 2' from the stack, it may be of advantage if at least one but preferably several indentations 41 are distributed around the circumference in the part-portion 35 of the container jacket 17 disposed between the bottom end region 12 of the outer part 4 and the base 18. This allows air to flow during removal and prevents a vacuum from being created between combination packaging containers 2, 2' stacked one inside the other. The indentation 41 extends across the entire height of the part-portion 35 as viewed in the direction of the longitudinal axis 9.

In the case of the combination packaging containers 2, 2' described above, the sleeve-shaped outer part 4 assumes the function of transmitting the supporting load in the direction of the longitudinal axis 9 from the flange 20 through to the base 18 and the end face 29 disposed there.

In the case of known combination packaging containers 2, 2' made by the inline process in the past, the standard approach has been to use a film with an initial thickness of 0.75 mm and thicker, depending on the container size. If the combination packaging container 2 is produced as illustrated in FIGS. 3 and 4, however, it has proved to be of advantage to reduce the initial wall thickness of the sheet 5 still further in order to make additional savings on raw material reserves. Since the inner container 3 is now required to fulfil nothing more than a sealing function, it is possible to opt for a wall thickness of less than 0.75 mm. In order to achieve a container jacket 17 with a minimum wall thickness, it has now proved possible to manufacture a combination packaging container 2 from a sheet 5 with an initial thickness of 0.5 mm or even less. This can cause problems if the flange 20 is intended as a seal rim because although it permits a perfectly good sealing process, the thinner film thicknesses mean that detaching the seal seam usually causes damage and can even cause the flange 20 to be completely torn off the container jacket 17. To this end, it would be of advantage to provide an additional tab 42 in the region of the flange 20, as illustrated on a simplified basis in FIG. 5, and this is formed as an integral piece with the flange 20 during the manufacturing process. This option is possible with both of the embodiments illustrated here.

The open end 19 is closed off in a known manner during the course of the sealing process and although not illustrated, the tear-off tab of the seal cover is preferably oriented so that it sits in an overlapping position with the tab 42. Accordingly, as the seal cover is being torn off, the tear-off tab of the seal cover on the one hand and the tab 42 of the inner container 3 on the other hand are both held, thus making the tear-off operation significantly easier. This means that the tear-off tab of the seal cover and the tab 42 in the region of the flange 20 are not joined to one another, which enables the two tabs to be gripped separately. Providing the tab 42 results in a certain amount of bracing when opening the combination packaging container 2.

Figure 10:
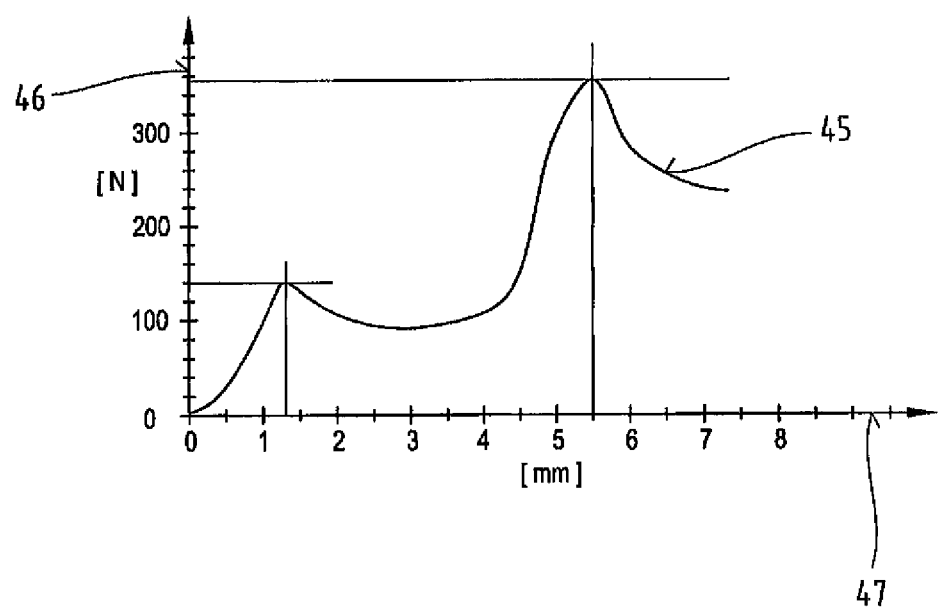
FIG. 10 is another comparative diagram of the crushing test conducted on a combination packaging container based on that illustrated in FIGS. 5 to 7.

The individual graphs of FIGS. 8 to 10 show curves 43 to 45 plotting the crushing resistance of different combination packaging containers 2. Beaker types were made using the same material for the inner container 3 and outer part 4, based on the same dimensions in the region of the open end 19 and the same capacity for the same height of beaker, and these were compared with one another with a view to obtaining meaningful values. Curves 43 to 45 plot averaged values obtained from several sets of measurements taken on beakers of the same type. The pressure was applied by placing the combination packaging containers 2 with their flange 20, in other words the open end 19, upside down on a support bed so that the base constitutes the top end of the beaker. The compression tests were conducted in this upside down position and the deformation distance recorded. The compression force was applied in the direction parallel with the longitudinal axis 9.

FIG. 8 illustrates the compression test conducted on a known combination packaging container specified in EP 0 102 522 A1—illustrated in FIG. 1—the force applied being plotted on an ordinate 46 in [N] and the compression distance being plotted on an abscissa 47 in [mm]. The first maximum value of the graph is obtained at a compression length of approximately 1.3 mm, and in this instance the beaker was capable of absorbing a force of approximately 160 kN. At this first maximum value of the curve 43, the base starts to buckle and continued and more pronounced deformation of the beaker takes place when the force is removed. The outer part 4 then assumes the supporting function, as a result of which a maximum value is achieved with a deformation of ca. 8.5 mm and absorbed force of ca. 325 N. The beaker then starts to collapse on itself due to the outwardly projecting stack shoulder incorporated in the region of the open end so that a higher compression force could not be achieved.

FIG. 9 is another diagram illustrating the force absorbed by the combination packaging container 2 illustrated in FIGS. 3 and 4 with the resultant curve 44. The force is plotted on the ordinate 46 in [N] and the compression distance [mm] is plotted on the abscissa 47. The first maximum value of the curve is obtained at a compression distance of ca. 1.1 mm, and the force absorbed is already ca. 240 N. This first maximum value is achieved when the outer part 4 has been completely pushed onto the flange 20 and the flange 20 is lifted off the support bed, not illustrated, in the manner of a hinge, from the transition towards the container jacket 17 at the ends remote from it. With the flange 20 in this position, there is a slight reduction in the compression force absorbed by the combination packaging container, and after a short additional deformation distance at ca. 1.9 mm, the absorbed compression force is just short of 400 N at the total deformation distance. Once this maximum value has been reached, the outer part 4 starts to deform to a more pronounce degree and is no longer able to absorb a higher compression force.

Finally, FIG. 10 plots the average curve 45 under compression load for the embodiment of the combination packaging container 2 illustrated in FIGS. 5 to 7. In terms of the initial curve, it corresponds to that already described in connection with FIG. 8 because the chosen base design is very similar. In this instance, the first maximum value of ca. 140 N is achieved at a deformation distance of ca. 1.3 mm. This is followed by a deformation of the base, as a result of which the absorbed force initially decreases at a long deformation distance until the outer part 4 assumes the supporting function. This is followed by a rapid supporting action of the outer part 4 and hence a higher force absorption, and the next maximum value is also the maximum value at which a force of ca. 355 N can be absorbed at a compression distance of ca. 5.5 mm. This value is higher than that shown in FIG. 8 because there is no stacking shoulder in the region of the open end 19. Again in this instance, the outer part 4 starts to lose its supporting function and the supporting function of the combination packaging container 2 drops sharply again.

FIGS. 11 to 13 illustrate another embodiment of the combination packaging container 2, which may be construed as an independent solution in its own right, the same reference numbers and component names being used to denote parts that are the same as those described in connection with FIGS. 1 to 10 above. To avoid unnecessary repetition, reference may be made to the detailed description given above in respect of FIGS. 1 to 10.

As described above, the choice of materials used for the manufacturing process plays an essential role. In the case of materials which shrink to a greater degree after moulding and cooling, a problem arises, especially if making combination packaging containers by the inline method, because the container wall 14 of the inner container 3 formed during the manufacturing process moves apart from the internal face 10 of the outer part 4 so that a slight gap is created between the container wall 14 or container jacket 17 and the outer part. If using polypropylene (PP) as a material, a shrinkage of ca. 2% can be anticipated. If the inner container and outer part are manufactured separately from one another, in other words offline, allowance can be made for the shrinkage which occurs when producing the inner container. For example, the inner container can be made to a size larger than the amount of shrinkage that will subsequently occur. After shrinking, the two mutually adapted parts can then be assembled or the inner container can be wound with the outer part.

In the case of the combination packaging container 2 illustrated here, the first pinched region 30 described above is provided in the base region 13 of the container jacket 17 facing the base 18, which is disposed at a distance from the bottom end region 12 of the outer part 4.

As may be seen more clearly by comparing FIGS. 11 and 12, another pinched region 48 is disposed or formed in the region of the other wall portion 34 between the first pinched region 30 and the end region 11 of the outer part 4 facing the flange 20 oriented in the radial direction towards the longitudinal axis 9.

It should be pointed out that the deep-drawing mould 1 designed to produce this and the associated method of manufacturing the combination packaging container 2 will be explained in more detail below.

The other pinched region 48 illustrated here is formed during the manufacturing process in both the outer part 4 and the container jacket 17 and due to the shrinkage, the pinched region 48 is almost moved back in the region of the outer part 4 due to the intrinsic properties of the material. This is a process which occurs automatically during cooling. As also illustrated, the other pinched region 48 is disposed at a distance from the end region 11 of the outer part 4 facing the flange in the axial direction towards the base 18. The dimension of this distance will depend on the size and capacity of the combination packaging container 2 and may be between 0.5 cm and 2.5 cm, for example.

Due to the fact that the jacket-shaped outer part 4 is preferably made from a recyclable material based on cellulose, such as paper or cardboard for example, a deformation is able to take place during the process of shaping the combination packaging container 2 but this almost completely rebounds again on removal from the deep-drawing mould 1 and subsequent cooling. This being the case, the size of the other pinched region 48 in the container jacket 17 of the inner container 3 has a bigger value than the value of the size of the other pinched region 30 in the outer part 4. This value of the pinched region in the outer part may drop to zero after rebound. In this context, size of the pinched region is intended to mean the variance of the components or wall parts of the outer part 4 and container jacket 17 disposed on either side of the pinched region 48 from an extended arrangement. The other pinched region 48 therefore forms a region that is buckled to a greater or lesser degree in the longitudinal extension of the outer part 4 and/or container jacket 17.

FIG. 13 illustrates a part-section of the combination packaging container 2 in its base region 13 incorporating the first pinched region 30 described above. Due to the described shrinkage behaviour of the material after moulding the inner container 3, the container wall 14 or container jacket 17 in this region also moves apart from the internal face 10 or inner face of the outer part 4 facing the longitudinal axis 9.

As may be seen by comparing FIGS. 12 and 13, the outer part 4 is supported on or sits on the inner container 3 in the region immediately adjoining the end faces 28, 29 on the internal face 10 or inner face of the outer part 4 spaced apart from one another in the axial direction. Between these supporting regions, there is usually a minimum distance between the container jacket 17 and outer part 4.

It should also be pointed out that the positioning of the other pinched region 48 in the region of the open end 19 of the combination packaging container 2 may be used on its own and the first pinched region 30 may also be dispensed with if necessary. However, if it is necessary to provide co-operating supporting means 22, 23 to enable combination packaging containers 2, 2' of the same type to be stacked one inside the other, the design based on the first pinched region 30 described above is used.

FIGS. 14 to 16 illustrate another embodiment of the deep-drawing mould 1, which may optionally be construed as an independent solution in its own right, the same reference numbers and component names being used to denote parts that are the same as those described in connection with FIGS. 1 to 13 above. To avoid unnecessary repetition, reference may be made to the detailed description given in connection with FIGS. 1 to 13 above.

In the diagram of the deep-drawing mould 1 illustrated here, the ready moulded outer part 4 is illustrated in its mould cavity 6 after the moulding process and in order to retain clarity, the inner container 3 has been left out of the drawing. As described above, the inner container 3 and outer part 4 are moulded jointly in a joint moulding operation inside the deep-drawing mould 1.

In addition to the deep drawing mould 1 illustrated in FIGS. 1 and 2, the deep-drawing mould 1 illustrated in this instance is one where the mould wall 7 bounding the mould cavity 6 does not have a straight contour in the region where the open end 19 of the combination packaging container 2 will be produced, as viewed in axial section. As viewed in axial section, therefore, the mould wall 7 bounding the mould cavity 6 has a buckled region 49 in the region of the open end 19 of the combination packaging container 2 to be produced.

The mould wall 7 extending between the shoulder 15 forming the pinched region 30 and the open end 19 of the combination packaging container 2 therefore has a first mould wall portion 50 in the region between the buckled region 49 and the open end 19 to be produced. Another mould wall portion 51 is provided between the buckled region 49 and the base 18 to be formed or the shoulder 15 disposed or provided there.

As may best be seen from FIGS. 14 and 15, a first angle of inclination 52 is subtended by the first mould wall portion 50 and the longitudinal axis 9 as viewed in axial section, which is bigger than another angle of inclination 53 subtended by the other mould wall portion 51 and the longitudinal axis 9. A differential angle 54 between the bigger first angle of inclination 52 and the smaller angle of inclination 53 of the two mould wall portions 50, 51 also constitutes a dimension of the pinched region 48. In this respect, the pinched region 48 may also be construed as a variance from an imaginary straight line between the two mould wall portions 50, 51 spaced apart from one another in the axial direction.

The design and disposition of the first pinched region 30 may be the same as those described above. The shoulder 15 disposed in the deep-drawing mould 1 for forming the first pinched region 30 between the two wall portions 24 and 34 is illustrated on a larger scale in FIG. 16. It illustrates the residual re-shaping of the outer part 4 caused by the pressing action against the shoulder 15.

During manufacture and hence implementation of the method of producing the combination packaging container 2, the outer part 4 is firstly placed in the deep-drawing mould 1 in its jacket-shaped and non-deformed initial shape and the inner container 3 is then pressed against the internal face 10 of the outer part 4 during the inline process to produce the combination packaging container 2. During the process of jointly moulding the inner container 2 and jacket-shaped outer part 4, the other pinched region 48 is moulded in the radial direction towards the longitudinal axis 9 and the top part-portion of the other wall portion 34 is moulded outwards in the radial direction by reference to the longitudinal axis in the region of the other wall portion 34 between the first pinched region 30 and the end region 11 of the outer part 4 facing the flange 20, as viewed in axial section. As described above, the other pinched region 48 is disposed at a distance apart from the end region 11 of the outer part 4 towards the base 18 as viewed in the axial direction. Once the inner container 2 and jacket-shaped outer part 4 have been jointly moulded, the other pinched region 48 rebounds automatically and almost completely, at least in the jacket-shaped outer part 4. As a result, the other wall portion 34 of the outer part 4 extends in a virtually straight line in this region. This automatic rebounding of the material to form the outer part 4 preferably takes place during a predefined storage period of the combination packaging container 2 during which the shrinkage of the inner container 3 takes place.

This radial shrinkage, especially that of the container jacket 17, between the base 18 and the flange 20 results in the minimum spacing of the container jacket 17 from the internal face 10 or inner face of the outer part 4 described above.

The embodiments illustrated as examples represent possible variants of the combination packaging container 2 and deep-drawing mould 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the combination packaging container 2 and the deep-drawing mould 1, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 2; 3, 4; 5, 6, 7; 8; 9; 10, 11, 12, 13, 14, 15, 16 constitute independent solutions proposed by the invention in their own right. The objectives and associated solutions proposed by the invention may be found in the detailed descriptions of these drawings.

LIST OF REFERENCE NUMBERS

1 Deep-drawing mould
2, 2' Combination packaging container
3 Inner container
4 Outer part
5 Sheet 6 Mould cavity
7 Mould wall
8 Mould stamp
9 Longitudinal axis
10 Internal face
11 End region (top)
12 End region (bottom)
13 Base region
14 Container wall
15 Shoulder
16 External face
17 Container jacket
18 Base
19 Open end
20 Flange
21 Container volume
22 Supporting means
23 Supporting means
24 Wall portion
25 Height
26 Distance
27 Bottom face
28 End face
29 End face
30 Pinched region
31 Height
32 Initial thickness
33 Thickness
34 Wall portion
25 Part-portion
36 Fold
37 Terminal end
38 Supporting region
39 Thickness
40 External face
41 Indentation
42 Tab
43 Curve
44 Curve
45 Curve
46 Ordinate
47 Abscissa
48 Pinched region
49 Buckled region
50 Mould wall portion
51 Mould wall portion
52 Angle of inclination
53 Angle of inclination
54 Differential angle

The invention claimed is:

1. Method of producing a combination packaging container, whereby a sleeve-shaped outer part is placed in a deep-drawing mold before deep drawing a beaker-shaped inner container from a sheet of a plastic material, after which the beaker-shaped inner container with a container jacket, a base and a flange projecting out from the container jacket in the region of an open end of the beaker-shaped inner container is molded by a deep drawing process, during which the inner container is applied to an internal face of the sleeve-shaped outer part to form the combination packaging container, and co-operating supporting means to enable several combination packaging containers of the same type to be stacked are formed on the combination packaging container, and an end face of the outer part facing the flange is disposed immediately adjacent to a bottom face of the flange facing the base of the inner container or is applied against the bottom face of the flange, wherein the sleeve-shaped outer part is placed in the deep-drawing mold as a component extending in a straight line between end regions of the sleeve-shaped outer part spaced apart from one another in a direction of a longitudinal axis, and the inner container is applied against the sleeve-shaped outer part as the inner container is molded, and the inner container and the sleeve-shaped outer part are forced against a mold wall of the deep-drawing mold, and a pinched region projecting in a radial direction towards the longitudinal axis is formed in the container jacket in a base region of the container jacket and of the sleeve-shaped outer part and constitutes the first supporting means, and a first and another wall portion are formed respectively between the pinched region and the two end regions of the sleeve-shaped outer part.

2. Method as claimed in claim 1, wherein the sleeve-shaped outer part is of a single-layered design between the end regions of the sleeve-shaped outer part spaced apart from one another in the direction of the longitudinal axis.

3. Method as claimed in claim 1, wherein the pinched region projecting in the radial direction towards the longitudinal axis is based on a step-shaped design.

4. Method as claimed in claim 1, wherein the pinched region of the container jacket has a height in the radial direction, by reference to the longitudinal axis, which is greater than an unformed initial thickness of the outer part.

5. Method as claimed in claim 1, wherein a thickness of the first wall portion of the outer part between the pinched region and the end region facing the base is compressed in the radial direction, by reference to the longitudinal axis, by an amount with a lower limit of 2% and an upper limit of 20% compared with an unformed initial thickness of the first wall portion.

6. Method as claimed in claim 1, wherein a circumferentially extending fold is provided in the internal face of the sleeve-shaped outer part in the end region facing the base.

7. Method as claimed in claim 6, wherein during molding of the container jacket onto the sleeve-shaped outer part, a supporting region projecting towards the longitudinal axis is formed on a terminal end of the fold facing away from the base at the terminal end which constitutes the first supporting means.

8. Method as claimed in claim 7, wherein the supporting region has a height in the radial direction, by reference to the longitudinal axis, which is greater than a thickness of the fold.

9. Method as claimed in claim 6, wherein the pinched region is formed in the sleeve-shaped outer part in a region of a terminal end of the fold.

10. Method as claimed in claim 1, wherein the other wall portion of the outer part extends continuously in a straight line between the pinched region and the end region facing the flange as viewed in axial section.

11. Method as claimed in claim 1, wherein the other wall portion of the outer part is conical between the pinched region and the end region facing the flange, tapering from the flange in a direction towards the base.

12. Method as claimed in claim 1, wherein the first wall portion of the outer part extends continuously in a straight line between the pinched region and the end region facing the base as viewed in axial section.

13. Method as claimed in claim 1, wherein the other supporting means is formed by an end face of the outer part facing the base.

14. Method as claimed in claim 1, wherein a part-portion of the container jacket as well as the base extend beyond the end region of the sleeve-shaped outer part facing the base.

15. Method as claimed in claim 14, wherein the part-portion of the container jacket extends with an external face of the part-portion facing away from the longitudinal axis at least flat in a same plane as an external face of the sleeve-shaped outer part.

16. Method as claimed in claim 14, wherein at least one indentation projecting in the direction towards the longitudinal axis is disposed in the part-portion of the container jacket.

17. Method as claimed in claim 1, wherein the sleeve-shaped outer part is joined to the container jacket of the inner container by means of a peel-off adhesive.

18. Method as claimed in claim 1, wherein a coating to repel moisture is applied to the outer part in the end region facing the base.

19. Method as claimed in claim 1, wherein whilst jointly molding the inner container and the sleeve-shaped outer part, another pinched region is molded in the radial direction towards the longitudinal axis in the region of the other wall portion between the pinched region and the end region of the outer part facing the flange, as viewed in axial section.

20. Method as claimed in claim 19, wherein the other pinched region is disposed at a distance apart from the end region of the outer part facing the flange in the axial direction towards the base.

21. Method as claimed in claim 19, wherein after jointly molding the inner container and the sleeve-shaped outer part as well as a predefined storage period, the other pinched region automatically rebounds almost completely, at least in the sleeve-shaped outer part, so that the other wall portion is almost straight.

* * * * *